United States Patent [19]

Ackerman et al.

[11] Patent Number: 5,749,694
[45] Date of Patent: May 12, 1998

[54] REAR LIFT GATE-MOUNTED BICYCLE MOUNT FOR PASSENGER VAN

[75] Inventors: Robert S. Ackerman, Bloomfield; L. John Ozark, Grosse Pointe Woods, both of Mich.

[73] Assignee: Chrysler Corporation, Auburn Hills, Mich.

[21] Appl. No.: 582,250

[22] Filed: Jan. 3, 1996

[51] Int. Cl.⁶ .................................................. B60P 9/00
[52] U.S. Cl. ......................... 414/462; 224/482; 224/924
[58] Field of Search ............................ 414/462; 224/401, 224/482, 488, 511, 534, 517, 536, 317, 325, 924

[56] References Cited

U.S. PATENT DOCUMENTS

| | | | |
|---|---|---|---|
| 3,828,993 | 8/1974 | Carter | 224/924 |
| 4,019,664 | 4/1977 | Weiler | 224/401 |
| 4,078,708 | 3/1978 | Mayer | 224/517 |
| 4,171,077 | 10/1979 | Richard, Jr. | 224/517 |
| 4,241,858 | 12/1980 | Lawroski | 224/401 |
| 4,635,835 | 1/1987 | Cole | 414/462 |
| 4,671,439 | 6/1987 | Groeneweg | 224/42.03 |
| 4,785,980 | 11/1988 | Redick | 224/42.03 |
| 4,884,728 | 12/1989 | Temple | 224/401 |
| 4,907,728 | 3/1990 | Giblet | 224/401 |
| 4,957,228 | 9/1990 | Balka | 224/42.03 |
| 5,169,042 | 12/1992 | Ching | 224/924 |
| 5,269,446 | 12/1993 | Biehn | 224/924 |
| 5,275,319 | 1/1994 | Ruana | 224/924 |
| 5,314,101 | 5/1994 | White | 224/42.03 |
| 5,476,201 | 12/1995 | Hall et al. | 224/924 |

FOREIGN PATENT DOCUMENTS

| | | | |
|---|---|---|---|
| 3526243 | 2/1987 | Germany | 224/924 |
| 4011315 | 10/1991 | Germany | 224/924 |

*Primary Examiner*—James W. Keenan
*Assistant Examiner*—Douglas Hess
*Attorney, Agent, or Firm*—Margaret A. Dobrowitsky

[57] ABSTRACT

A system for holding at least one bicycle onto the vertically-oriented rear lift gate of a passenger van includes an upper mount affixed to the upper portion of the lift gate and a lower mount affixed to the lower portion of the lift gate. The upper mount includes a quick release mechanism for clamping the front fork of a bicycle thereto, while the lower mount includes a mount surface for receiving the rear tire of a bicycle therein. A strap holds the tire onto the mount surface of the lower mount.

19 Claims, 2 Drawing Sheets

5,749,694

REAR LIFT GATE-MOUNTED BICYCLE MOUNT FOR PASSENGER VAN

FIELD OF INVENTION

The present invention relates generally to vehicles, and more particularly to bicycle mounts for passenger vans.

Background of the Invention

Recreational vehicles such as passenger vans are becoming increasingly popular. One reason for their popularity is that vehicles such as vans are multi-purpose, i.e., vans can be used to transport people and equipment for a wide variety of purposes. More particularly, because passenger vans typically have larger passenger compartments than most automobiles, a greater number of people and a wider variety of odd-sized equipment such as skis and other sporting equipment can be transported in vans, as compared to automobiles.

It happens that with the increasing popularity of recreational bicycling, the attractiveness of van ownership is enhanced, owing to the ease with which bicycles can be loaded into and transported in vans. Unfortunately, while bicycles can be easily loaded and comfortably stowed in the passenger compartments of most passenger vans, a relatively large amount of space in the passenger compartment is occupied thereby. This undesirably reduces the space available for people and additional equipment. As recognized by the present invention, however, it is possible to provide a means whereby a passenger van can be used to easily and conveniently transport bicycles, without undesirably reducing usable stowage space in the van's passenger compartment, thereby enhancing the utility of the van.

Accordingly, it is an object of the present invention to provide a bicycle mounting system for a passenger van which does not require positioning a bicycle inside the passenger compartment of the van to transport the bicycle. Another object of the present invention is to provide a bicycle mounting system for a passenger van which permits easily and conveniently mounting a bicycle on the van. Still another object of the present invention is to provide a bicycle mounting system for a passenger van which is easy to use and cost-effective to manufacture.

SUMMARY OF THE INVENTION

A bicycle mounting system is disclosed for use in a passenger van having a passenger compartment and a rear lift gate selectively movable between an open position, wherein the lift gate does not cover the passenger compartment, and a closed position, wherein the lift gate covers the passenger compartment.

The lift gate defines an upper portion and a lower portion, and the bicycle mounting system includes at least one upper mount having a base. In turn, the base includes a base surface that is attachable to the upper portion of the lift gate. A hollow base holder is spaced from the base surface and defines a channel and left and right ends. Moreover, a clamp element is engaged with the channel of the base holder. In accordance with the present invention, the clamp element is movable between a release configuration, wherein left and right fork elements of a bicycle's front fork can be advanced between the clamp element and the respective left and right ends of the base holder, and a clamp configuration, wherein left and right fork elements of a bicycle's front fork can be clamped between the clamp element and the base holder.

At least one lower mount is attachable to the lower portion of the lift gate. Per the present invention, the lower mount includes a receptacle surface which is configured for receiving a bicycle rear tire. The lower mount further includes a fastening element for holding a bicycle rear tire against the receptacle surface.

The van includes a body, and the preferred system further includes a counterbalance cylinder that interconnects the body and lower portion of the lift gate. Thereby, moving the lift gate toward the open position when a bicycle is engaged with the mounts is facilitated.

In the preferred embodiment, the clamp element includes first and second clamp surfaces which respectively face the left and right ends of the base holder. Respective left and right fork elements can be respectively clamped therebetween. More preferably, the clamp element includes a shaft and an adjustment member threadably engaged with the shaft. The adjustment member establishes the first clamp surface. A quick release member is threadably engaged with the shaft, and the quick release member establishes the second clamp surface. The quick release member is manipulable to selectively establish the release and clamp configurations of the clamp element.

As intended by the presently preferred embodiment, each fork element defines a width. A release distance that is greater than the width is established between each clamping surface and the respective end of the base holder in the release configuration.

On the other hand, a clamping distance that is substantially equal to the width is established between each clamping surface and the respective end of the base holder in the clamp configuration. The adjustment member is manipulable to establish the release distance.

In another aspect of the present invention, a van is disclosed which includes the bicycle mounting system disclosed above.

In yet another aspect, a bicycle mounting system for a passenger van having a rear lift gate defining upper and lower portions includes an upper mount. This upper mount is affixable to the upper portion of the lift gate for holding a first component of a bicycle. A lower mount is affixable to the lower portion of the lift gate for holding a second component of the bicycle.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
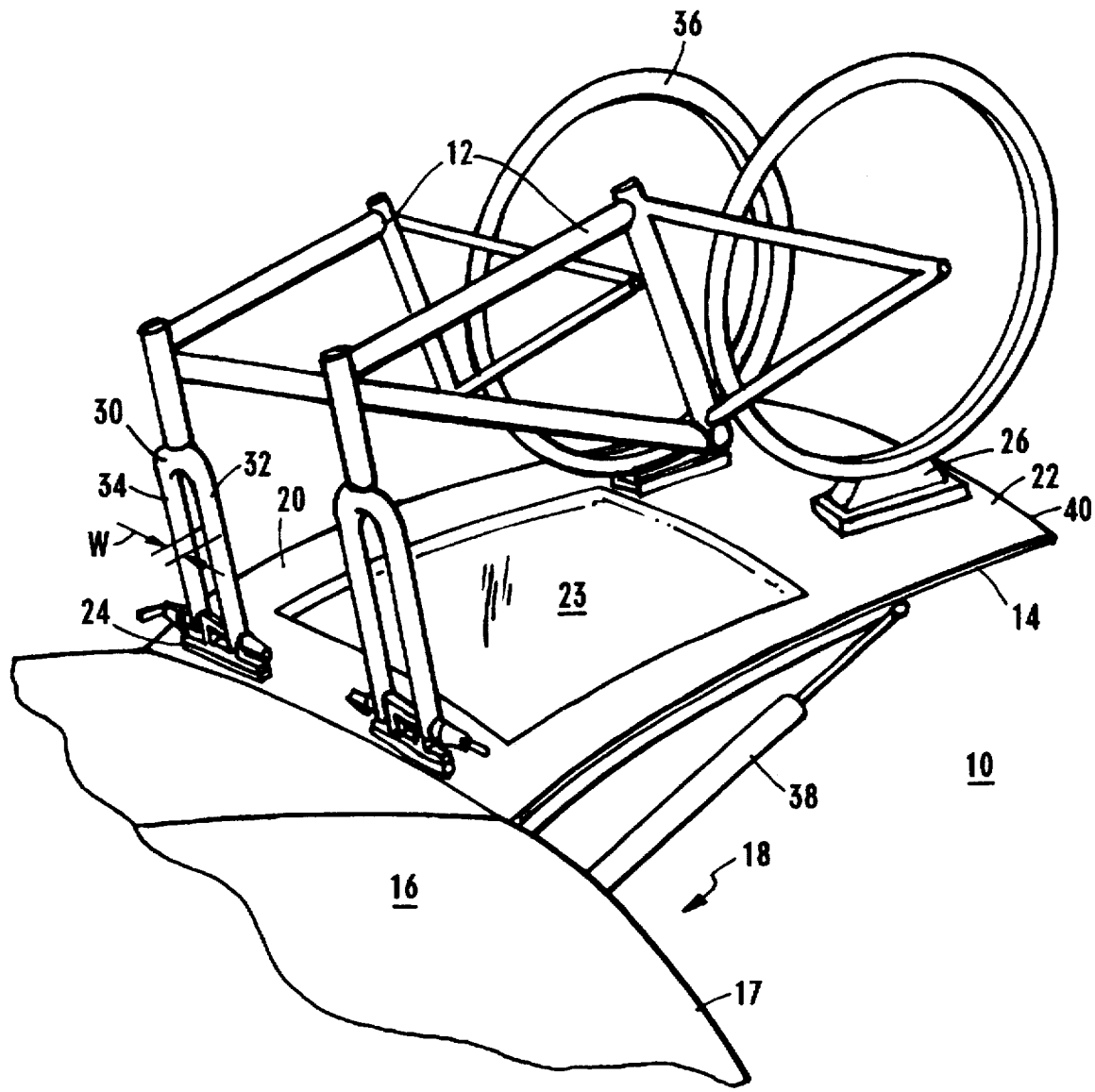
FIG. 1 is a perspective view of the rear lift gate-mounted bicycle mount of the present invention, shown in its intended environment interconnecting two bicycles with the rear lift gate of a passenger van, with portions of the van and bicycles removed for clarity.

Referring initially to FIG. 1, a system is shown, generally designated 10, for interconnecting a plurality of bicycles 12 to a rear lift gate 14 of a passenger van 16 having a body 17. In accordance with the passenger van art, the van 16 defines a passenger compartment 18, and the rear lift gate 14 is hinged to about its upper edge to the body 17 for selectively movement to an open position (shown in FIG. 1), wherein the lift gate 14 does not cover the passenger compartment 18. Further, the lift gate 16 can be moved to a closed position, wherein the lift gate 16 covers the passenger compartment 18.

As shown in FIG. 1, the lift gate 16 defines an upper portion 20 and a lower portion 22, and may include a rear window 23. One or more upper mounts 24 are affixed to the upper portion 20 of the lift gate 16, while one or more corresponding lower mounts 26 (only one lower mount 26 shown) are affixed to the lower portion 22 of the lift gate 16. One upper mount 24 and one lower mount 26 establishes a bicycle mounting system for holding a bicycle 12 onto the lift gate 16. While FIG. 1 shows that in the preferred embodiment two pair of mounts 24, 26 are provided, it is to be understood that the principles of the present invention apply to passenger vans having one, three, or more pair of mounts attached thereto.

As further shown in FIG. 1, each bicycle 12 includes a generally U-shaped front fork 30 that is established by left and right fork elements 32, 34. Also, each bicycle 12 has a rear tire 36. As disclosed in detail below, the front tire of a bicycle 12 is removed and the upper mount 24 selectively holds the fork 30 of a bicycle 12 onto the upper portion 20 of the lift gate 16. On the other hand, the lower mount 26 selectively holds the rear tire 36 of the bicycle 12 onto the lower portion 22 of the lift gate 16.

Additionally, a counterbalance pneumatic lift cylinder 38 interconnects the van body 17 (preferably adjacent the roof of the van 14 as shown) and lower portion 22 of the lift gate 16 to facilitate moving the lift gate 16 toward the open position when a bicycle 12 is engaged with the mounts 24, 26. Indeed, the lift cylinder 38 is connected to the lift gate 16 near (within a few inches of) a lower edge 40 of the lift gate 16. The lift cylinder 38 can be any suitable automotive lift cylinder, modified as necessary to be sufficiently long to interconnect the lift gate 16 with body 17 as shown. The lift cylinder 38 is connected to the lift gate 16 and body 17 by means well-known in the art.

We have discovered that with the above-disclosed combination of structure facilitates manually moving the lift gate 16 toward the open position when one or more bicycles 12 are mounted on the lift gate 16. On the other hand, once the lift gate 16 is moved toward the closed position, the above-disclosed structure prevents the weight of the bicycles 12 from causing the lift gate 16 to violently slam shut. Further, the bicycles 12, when mounted as shown, do not interfere with motion of the lift gate 16. Still further, the bicycles 12 can be conveniently mounted as shown without damaging the window 23 and without requiring that any mounting component be connected to the window 23.

Figure 2:
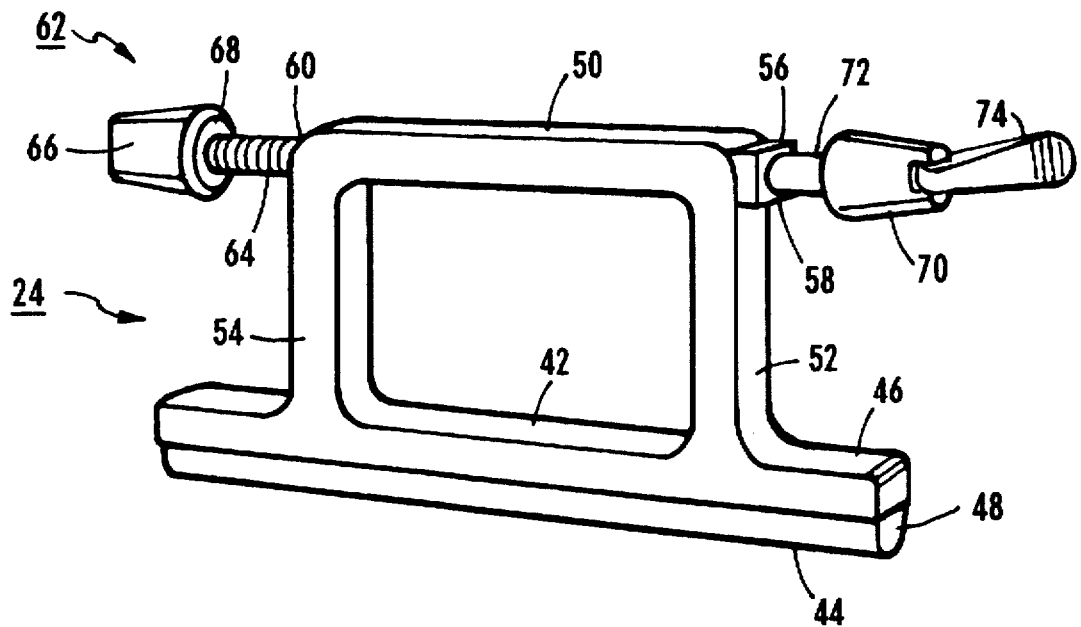
FIG. 2 is a perspective view of an upper mount of the present invention.

Now referring to FIG. 2, the details of the upper mount 24 of the present invention can be seen. As shown in FIG. 2, the upper mount 24 includes a rigid metal or plastic base 42 that is bolted, riveted, adhesively bonded, or otherwise affixed to the lift gate 16. The base 42 includes a base surface 44 established by a base plate 46, and the base surface 44 is attachable to the upper portion 20 of the lift gate 16. To this end, the base plate 46 is slightly contoured as required to lay flush against the upper portion 20. A resilient rubber or plastic pad 48 may establish the surface 44 as shown, with the pad 48 being sandwiched between the lift gate 16 and the base plate 46.

Additionally, the base 42 includes a hollow, elongated base holder 50 which is spaced from the base surface 44. In the particular embodiment shown, two legs 52, 54 interconnect the base plate 46 and base holder 50. Preferably, when the upper mount 24 is attached to the lift gate 16, the legs 52, 54 extend away from the lift gate 16, generally perpendicular thereto.

Consequently, the base holder 50 is spaced from the base plate 46 in a direction generally perpendicular to the lift gate 16.

Owing to the fact that it is hollow, the base holder 50 defines a channel 56. Moreover, the base holder 50 defines left and right ends 58, 60.

In accordance with the present invention, a clamp element, generally designated 62, is engaged with the channel 56 for movement of the clamp element 62 toward a release configuration, wherein the left and right fork elements 32, 34 (FIG. 1) can be advanced between the clamp element 62 and the respective left and right ends 58, 60 of the base holder 50. Also, the clamp element 62 can be moved toward a clamp configuration, wherein the left and right fork elements 32, 34 are clamped between the clamp element 62 and the base holder 50.

In the presently preferred embodiment, the clamp element 62 is a bicycle quick release mechanism of the type used as a front axle for a bicycle wheel. Accordingly, the clamp element 62 preferably includes an externally threaded elongated metal shaft 64. Also, the clamp element 62 includes a metal cap-shaped internally threaded adjustment member 66 which is threadably engaged with the shaft 64. Per the present invention, the adjustment member 66 establishes a first clamp surface 68 that faces the right end 60 of the base holder 50 for clamping the right fork element 34 therebetween.

Additionally, the clamp 62 includes a cap-shaped metal quick release member 70 which is threadably engaged with the shaft 64. Per the present invention, the quick release member 70 establishes a second clamp surface 72 that faces the left end 58 of the base holder 50 for clamping the left fork element 32 therebetween. An elongated rigid metal quick release lever 74 is pivotably coupled to the quick release member 70 by means well-known in the art to permit manipulation of the lever 74 to selectively establish the release and clamp configurations of the clamp element 62.

More specifically, in cross-reference to FIGS. 1 and 2 and taking the left fork element 32 as an example, the left fork element 32 defines a width "W". A release distance, which is greater than the width "W", is established between the second clamping surface 70 and the left end 58 of the base holder 50 when the clamp element 62 is in the release configuration. In contrast, a clamping distance that is substantially equal to the width "W" is established between the second clamping surface 70 and the left end 58 of the base holder 50 when the clamp element 62 is in the clamp configuration and the fork 30 is positioned as shown in FIG. 1. As envisioned by the present invention, the adjustment member 66 is manipulable to establish the release distance for the particular bicycle 12 being mounted on the lift gate 16.

Figure 3:
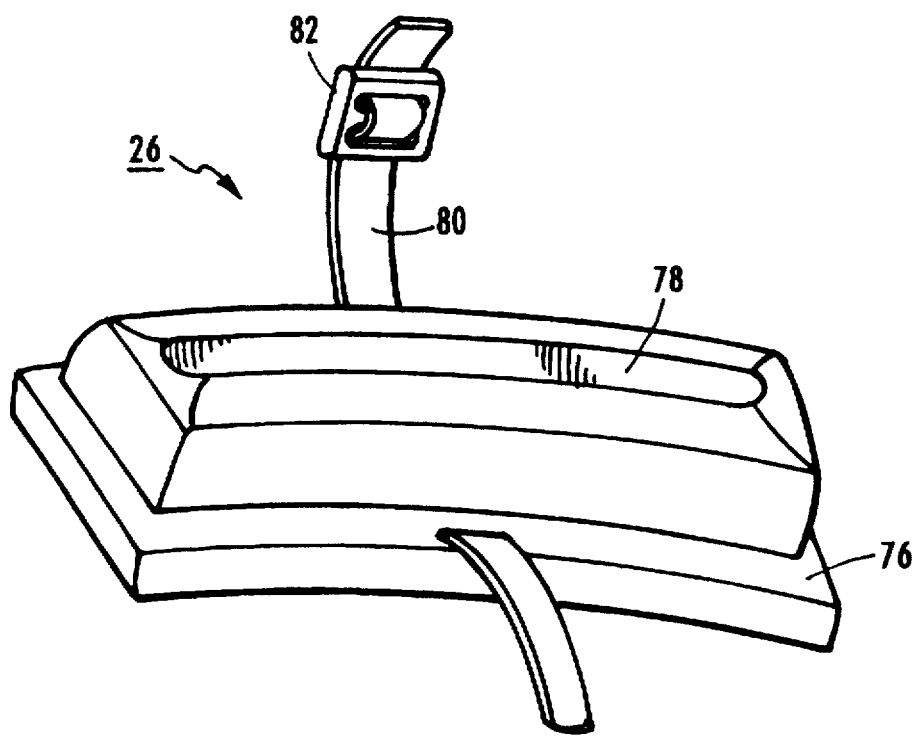
FIG. 3 is a perspective view of a lower mount of the present invention.

Referring now to FIG. 3, the lower mount 26 includes a rigid metal or plastic base 76 that is affixed to the lift gate 16 by means well-known in the art, near the lower edge 40 of the lift gate 16. The base 76 is slightly contoured as required to lay flush against the lower portion 20 of the lift gate 16.

A receptacle surface 78 is opposed to the base 76 and is configured as a trough for receiving the rear tire 36 therein. A fastening element, such as a strap 80 with buckle 82, is attached to the lower mount 26. The strap 80 can be positioned against the inner rim surface of the wheel 36 and engaged with the buckle 82 to hold the rear tire 36 tightly against the receptacle surface 78.

While the particular REAR LIFT GATE-MOUNTED BICYCLE MOUNT FOR PASSENGER VAN as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. In a passenger van having a passenger compartment and a rear lift gate selectively movable between an open position, wherein the lift gate does not cover the passenger compartment, and a closed position, wherein the lift gate covers the passenger compartment, the lift gate defining an upper portion and a lower portion when the lift gate is in the closed position, a bicycle mounting system, comprising:

at least one upper mount including:

a base, the base including a base surface attachable to the upper portion of the lift gate and a hollow base holder spaced from the base surface and defining a channel therethrough, the base holder defining left and right ends;

a clamp element engaged with the channel of the base holder, the clamp element being movable between a release configuration, wherein left and right fork elements of a bicycle's front fork can be advanced between the clamp element and the respective left and right ends of the base holder, and a clamp configuration, wherein left and right fork elements of a bicycle's front fork can be clamped between the clamp element and the base holder; and at least one lower mount attachable to the lower portion of the lift gate, the lower mount including a receptacle surface configured for receiving a bicycle rear tire therein, the lower mount further including a fastening element for holding a bicycle rear tire against the receptacle surface.

2. The system of claim 1, wherein the van includes a body, and the system further comprises a counterbalance cylinder interconnecting the body and lower portion of the lift gate to facilitate moving the lift gate toward the open position when a bicycle is engaged with the mounts.

3. The system of claim 1, further comprising at least two upper mounts and at least two lower mounts.

4. The passenger van of claim 3, in combination with two bicycles.

5. The system of claim 3, in combination with two bicycles.

6. The system of claim 1, wherein the clamp element includes first and second clamp surfaces respectively facing the left and right ends of the base holder for clamping respective left and right fork elements respectively therebetween.

7. The system of claim 6, wherein the clamp element includes:

a shaft;

an adjustment member threadably engaged with the shaft and establishing the first clamp surface; and a quick release member threadably engaged with the shaft and establishing the second clamp surface, wherein the quick release member is manipulable to selectively establish the release and clamp configurations of the clamp element.

8. The system of claim 7, wherein each said fork element defines a width, and a release distance greater than the width is established between each said clamping surface and the respective end of the base holder in the release configuration, and wherein a clamping distance substantially equal to the width is established between each said clamping surface and the respective end of the base holder in the clamp configuration.

9. The system of claim 8, wherein the adjustment member is manipulable to establish the release distance.

10. A passenger van, comprising:

a passenger compartment;

a rear lift gate selectively movable between an open position, wherein the lift gate does not cover the passenger compartment, and a closed position, wherein the lift gate covers the passenger compartment, the lift gate defining an upper portion and a lower portion when the lift gate is in the closed position;

at least one upper mount including:

a base, the base including a base surface attached to the upper portion of the lift gate and a hollow base holder spaced from the base surface and defining a channel therethrough, the base holder defining left and right ends;

a clamp element engaged with the channel of the base holder, the clamp element being movable between a release configuration, wherein left and right fork elements of a bicycle's front fork can be advanced between the clamp element and the respective left and right ends of the base holder, and a clamp configuration, wherein left and right fork elements of a bicycle's front fork can be clamped between the clamp element and the base holder; and at least one lower mount attached to the lower portion of the lift gate, the lower mount including a receptacle surface configured for receiving a bicycle rear tire therein, the lower mount further including a fastening element for holding a bicycle rear tire against the receptacle surface.

11. The passenger van of claim 10, further including a van body and a counterbalance cylinder interconnecting the body and lower portion of the lift gate to facilitate moving the lift gate toward the open position when a bicycle is engaged with the mounts.

12. The passenger van of claim 11, further comprising at least two upper mounts and at least two lower mounts.

13. The passenger van of claim 10, wherein the clamp element includes first and second clamp surfaces respectively facing the left and right ends of the base holder for clamping respective left and right fork elements respectively therebetween.

14. The passenger van of claim 13, wherein the clamp element includes:

a shaft;

an adjustment member threadably engaged with the shaft and establishing the first clamp surface; and a quick release member threadably engaged with the shaft and establishing the second clamp surface, wherein the quick release member is manipulable to selectively establish the release and clamp configurations of the clamp element.

15. The passenger van of claim 14, wherein each said fork element defines a width, and a release distance greater than the width is established between each said clamping surface and the respective end of the base holder in the release configuration, and wherein a clamping distance substantially equal to the width is established between each said clamping surface and the respective end of the base holder in the clamp configuration.

16. The passenger van of claim 15, wherein the adjustment member is manipulable to establish the release distance.

17. A bicycle mounting system for a passenger van having a rear lift gate defining upper and lower portions, comprising:

an upper mount affix able to the upper portion of the lift gate for holding a first component of a bicycle; and a lower mount affixable to the lower portion of the lift gate for holding a second component of the bicycle, wherein the first component includes left and right fork elements of a bicycle front fork and the second component is a bicycle rear tire, and the upper mount includes:

a base, the base including a base surface attachable to the upper portion of the lift gate and a hollow base holder spaced from the base surface and defining a channel therethrough, the base holder defining left and right ends; and a clamp element engaged with the channel of the base holder, the clamp element being movable between a release configuration, wherein left and right fork elements of a bicycle's front fork can be advanced between the clamp element and the respective left and right ends of the base holder, and a clamp configuration, wherein left and right fork elements of a bicycle's front fork can be clamped between the clamp element and the base holder.

18. The system of claim 17, wherein the lower mount includes:

a receptacle surface configured for receiving a bicycle rear tire therein; and a strap for holding a bicycle rear tire against the receptacle surface.

19. The system of claim 17, wherein the clamp element includes:

first and second clamp surfaces respectively facing the left and right ends of the base holder for clamping respective left and right fork elements respectively therebetween;

a shaft;

an adjustment member threadably engaged with the shaft and establishing the first clamp surface; and a quick release member threadably engaged with the shaft and establishing the second clamp surface, wherein the quick release member is manipulable to selectively establish the release and clamp configurations of the clamp element.

* * * * *